United States Patent [19]
Vallee et al.

[11] Patent Number: 6,151,355
[45] Date of Patent: Nov. 21, 2000

[54] WIRELESS MODEM

[75] Inventors: Richard Vallee, Saint-Leonard; Claude F. Lambert; Edward C. Prest, both of Laval; Andrew D. Morrow, Montreal; Norman D. Pearl, Saint-Laurent, all of Canada

[73] Assignee: DataRadio Inc., Mount Royal, Canada

[21] Appl. No.: 08/944,565

[22] Filed: Oct. 6, 1997

Related U.S. Application Data

[60] Provisional application No. 60/027,683, Oct. 7, 1996.

[51] Int. Cl.$^7$ ....................................................... H04B 1/38
[52] U.S. Cl. ...................... 375/220; 375/222; 379/93.28; 379/93.31
[58] Field of Search ................................... 375/220, 222, 375/257; 379/93.28, 93.31

[56] References Cited

U.S. PATENT DOCUMENTS

| | | | |
|---|---|---|---|
| 4,598,360 | 6/1986 | Loskorn | 364/200 |
| 4,665,519 | 5/1987 | Kirchner et al. | 370/94 |
| 5,012,489 | 4/1991 | Burton et al. | 375/8 |
| 5,130,984 | 6/1992 | Cisneros | 370/94.1 |
| 5,259,000 | 11/1993 | Kojima et al. | 375/8 |
| 5,359,648 | 10/1994 | Dunn et al. | 379/93 |
| 5,481,562 | 1/1996 | Pearson et al. | 375/222 |
| 5,530,718 | 6/1996 | Gradeler et al. | 375/222 |
| 5,687,222 | 11/1997 | Mclaughlin | 379/97 |

*Primary Examiner*—Stephen Chin
*Assistant Examiner*—Dac V. Ha
*Attorney, Agent, or Firm*—Ridout & Maybee

[57] ABSTRACT

A modem unit, typically a wireless modem unit, has a bidirectional digital data port, a modem, a transceiver, and a microcontroller programmed to control the unit according to a control program. The modem unit has a command mode, and the microcontroller is programmed to recognize certain commends by means of a prefix as remote commands and retransmit them to a remote modem unit rather than acting on them locally. The microcontroller is also programmed to monitor operating parameters of the modem unit and optionally to insert data relating to these parameters into a prefix to data strings transmitted by the modem unit and strip such prefixes from data strings received by the modem unit. The microcontroller controls switches which determine the routing of data between the port, the modem and the microcontroller so that the above functions may be implemented.

12 Claims, 1 Drawing Sheet

WIRELESS MODEM

REFERENCE TO RELATED APPLICATION

This application claims the benefit of Provisional Patent Application No. 60/027,683, filed Oct. 7, 1996.

BACKGROUND OF THE INVENTION

1. Field of the Invention

This invention relates to modems, and particularly to wireless modems, that is, modems designed to transmit digital data over radio links.

2. Review of the Art

Typically, wireless modems have been relatively unsophisticated, essentially comprising a combination of a modem similar to those used to transmit data over voice telephone lines with a radio transceiver similar to those used for radiotelephony. Particularly when such modems are used for unattended communications, as between telemetry systems and a monitoring station, it has been difficult to monitor the quality of the radio link or the proper operation of, the modem, both during set-up or maintenance of the system and during actual operation.

There is therefore an increasing demand for an economical wireless modem which allows for such monitoring. In order that wireless modems from different sources be interoperable, it is also desirable that such modems should utilize standardized communication protocols, enabling modems of different makes to intercommunicate.

SUMMARY OF THE INVENTION

It is an object of the present invention to provide a wireless modem which provides the capability of providing diagnostic data over a wireless link both in a command mode used to set up and test the modem, and during communications, within the framework of a defined communication protocol, and to deliver such diagnostic data independently of data being transported, and which is capable of setting up and obtaining diagnostic data from a remote modem of similar design.

According to a first aspect of the invention, a modem comprises a bidirectional serial digital data port, a transceiver, and a modem receiving digital data for transmission from said interface and converting it to analog signals for modulating a transmitter of said transceiver, and receiving and demodulating analog signals from a receiver of said transceiver to received digital data provided to said port, said modem unit further comprising a microcontroller connected to provide to said modem data to be modulated and transmitted and to receive received or demodulated data from said modem, and switches controlled by said microcontroller determining whether said modem receives data to be transmitted from the microcontroller and/or the port and whether the modem passes received data to the microcontroller and/or the port.

According to a second aspect of the invention, in a modem unit, comprising an external data port, a modem, a transceiver, and a microcontroller controlling the passage of data sequences to be transmitted from the port through the modem to the transceiver, and received data sequences from the transceiver through the modem to the port includes the wireless modem unit, the improvement wherein the microcontroller includes means to sense plural operating characteristics of the modem, wherein the microcontroller may be set up to delay a data string from the external port while it delivers to the modem a diagnostic header containing data as to said operating characteristics, and wherein the microcontroller if so set up is also set up to delay admission to the port of a data sequence received from said transceiver and modem while it diverts to itself a diagnostic header prepended to said received data sequence.

According to a further aspect of the invention, a modem unit, comprising an internal data port, a modem, a transceiver, and a microcontroller having an on line mode controlling the passage of data sequences to be transmitted from the port through the modem to the transceiver, and received data sequences from the transceiver through the modem to the port, the microcontroller also having a command mode in which it interprets data sequences received through the port and executes commands comprised by those sequences, includes the wireless modem unit the improvement wherein the microprocessor is configured in command mode to recognize data sequences from the data port having a particular first prefix as a command to construct a data sequence incorporating a command and the address of a remote modem unit comprised by the original data sequence and itself having a further prefix identifying it as containing a command, and to send the constructed sequence through the modem to the transceiver; and wherein the microcontroller is configured to recognize data sequences received from the transceiver and the modem and having such a further prefix as containing either a command or a response to command.

Other aspects of the invention will become apparent from the following description of a presently preferred embodiment of the invention.

SHORT DESCRIPTION OF THE DRAWING

FIG. 1 is a block schematic diagram of a modem in accordance with the invention.

DESCRIPTION OF THE PREFERRED EMBODIMENT

Figure 1:
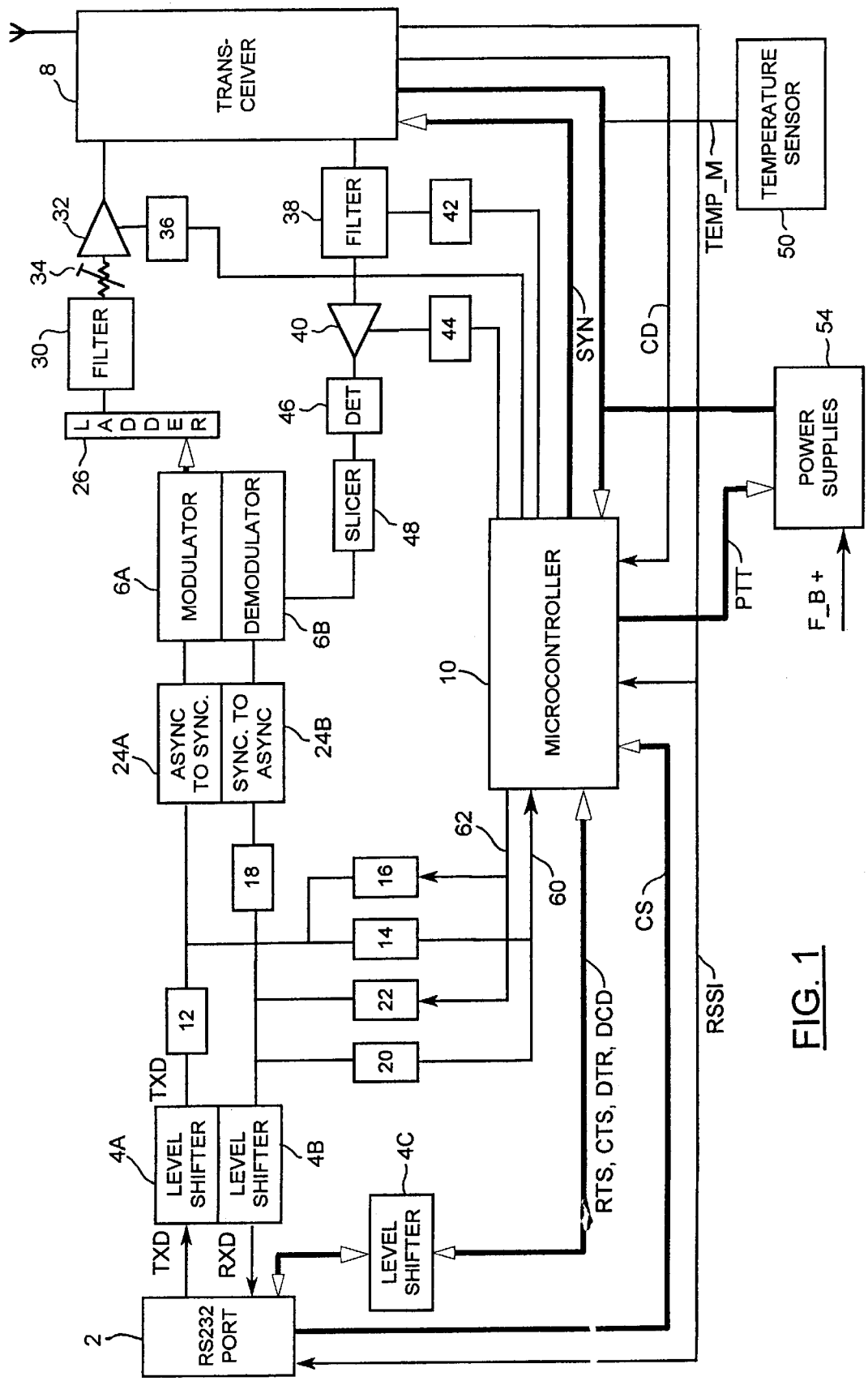

A typical modem unit in accordance with the invention comprises a serial data port 2 through which serial data is passed to and from the modem unit from an external unit such as a telemetry device or a supervisory computer, a modem proper comprising a modulator section 6A and a demodulator section 6B, a transceiver 8, and a microcontroller 10. In the case of a wireless modem, the transceiver 8 is a radio transceiver as shown.

In accordance with conventional practice, the port 2 has an input line TXD for data to be transmitted, an output line RXD for received data, and conventionally designated hand shaking lines, namely RTS, CTS, DTR and DCD. Data levels on these lines, which will typically be in accordance with RS232 standards, are converted to and from TTL levels comparable with the modem logic by level shifters 4A, 4B and 4C. For convenience, the physical connection providing this port may also be used to provide lines CS for transceiver channel selection and received signal strength indication (RSSI).

The microcontroller 10, which may be of type MC68HC11K4 from Motorola, comprises a microprocessor, random access memory (RAM), read only memory (ROM) (in this case electrically erasable ROM or EEPROM), and various peripheral functions including a number of input and output lines, analog to digital converter channels and a watchdog function, integrated into a single chip. Reference to a microcontroller in this specification should not be considered as excluding usage of a microprocessor and separate memory and peripheral chips to provide required functions.

A group of output lines from the microcontroller is used to control tristate buffer gates 12, 14, 16, 18, 20 and 22, which control respectively a connection between the TTL level TXD signal and input to an asynchronous to synchronous converter 24A providing an input to the modulator section 6A (gate 12), a connection between the input to converter 24A and an input 60 to the microcontroller programmed to accept serial data (gate 14), a connection between the input to converter 24A and an output 62 from the microcontroller programmed to output serial data (gate 16), a connection between an output from a synchronous to asynchronous converter 24B, which receives an output of demodulator section 6B, to the RXD TTL level signal (gate 18), a connection from the same output to the input 60 of the microcontroller programmed to accept serial data (gate 20), and connection between the serial output line 62 of the microcontroller and the RXD TTL level signal line (gate 22). Accordingly, by suitable control of these gates, the TXD line may be connected to the modem modulator and/or to the microprocessor, a signal from the microprocessor may be passed to the modem modulator, and/or to the RXD line, the microprocessor may receive a signal from the TXD line and/or the modem demodulator, and the RXD line may receive a signal from the modem demodulator and/or the microprocessor. These connections permits very versatile operation of the modem unit under firmware control.

The modem modulator function in the example described is to receive a synchronous data signal and modulate it to provide an analog output signal modulated in a selected mode, which in the embodiment described is MSK (minimum shift keying) when the data rate is 1200 or 2400 bits/sec and DGMSK (Differential Gaussian Minimum Shift Keying) at 4800 or 9600 bits/sec. 7-bit scrambling of the signal is applied to provide differential (NRZ1) encoding of the data when DGMSK is used so as to avoid unfavourable data patterns introducing undesirable components into the modulated signal. The modem demodulator provides complementary demodulation and unscrambling functions. The modulator and demodulator functions may be implemented by a suitably configured ASIC, or by utilizing commercially available chips, in conjunction with resistance ladder 26 constructing an analog output signal from parallel outputs of the modulator 6A.

The asynchonous to synchronous and synchronous to asynchronous converters 24A and 24B associated with the modem modulator and demodulator respectively may conveniently be implemented by the MC145428 chip from Motorola.

The radio transceiver 8 may be of conventional construction having regard to the channel frequencies modulation technique and bandwidth to be utilized. Conveniently, low level modulation and demodulation in the transceiver are carried out by an RF module, for example a 3422, 3412 or 3474 module from E. F. Johnson or a P52 module from Motorola. This module accepts the encoded analog signal from the ladder 26 after amplification stages 30 and 32 providing filtering and buffering respectively. A gain control 34 controls the amplitude of the signal applied to the transceiver and thus the deviation of the transmitted signal, which direction can also be switched by a microcontroller controlled analog gate 36 to compensate for different bit rates of the data.

Received signals from the transceiver 8 are applied to an input filter 38, and an amplifier 40, both having characteristics switched by analog gates 42, 44 to suit different data rates, followed by peak detectors 46 and a slicer 48 providing input to the demodulator 6B.

The microcontroller 10 is also programmed to perform additional monitoring and control functions through its input and output lines. Thus it receives on input lines channel selection signals which may be applied on lines CS through the same connector that implements the external port 2 of the modem or by switches (not shown), and translates these signals into synthesizer control signals applied through output lines SYN to a synthesizer in the RF module of transceiver 8. These control signals, including a synthesizer clock, will be calculated independently according to whether the transceiver is transmitting or receiving. Typically, the transceiver will transmit and receive on different frequencies, and in a network of modems a master unit will transmit at one frequency and receive at the other, while slave units will have reversed frequency usage. This means that the master unit can transmit to any slave unit, and any slave unit can transmit to the master unit, but the slave units cannot communicate with one another. A number of input lines to analog to digital converters incorporated in the microcontroller interface are connected directly, or through interface circuits (not shown) so as to monitor transceiver operation, power supplies 54 to the transceiver required for its proper operation, and other factors affecting transceiver operation such as a temperature signal TEMP-M from a temperature sensor 50. Other parameters sensed include the presence of carrier (CD) from the transceiver.

The signals whose levels are monitored by the A/D converters in the microcontroller are power supplies to the transceiver namely a transmitter power supply (not shown) XMIT__+ and an SW__+ supply (not shown), as well as a fused input supply F__B+ from which all other supplies to the modem are derived, a 5 volt supply (not shown) TX__5V to the transmitter logic of the transceiver, a 5 volt supply to the remaining modem logic, and a supply (not shown) ANAVCC to the analog circuits of the modem. A received signal strength index (RSSI) signal from the transceiver is also level monitored.

Control lines PTT to the power supply 54 determine whether the transmitter power supply outputs (and thus the transmitter) are active.

The functions of the various microcontroller inputs and outputs are set by a readable configuration register, and an ID number identifying the particular wireless modem unit is also held in the EEPROM of the microcontroller for use in identifying transmissions from the modem.

In operation, the modem provides conventional wireless modem functions, backwardly compatible with existing wireless modems using similar bit rates, modulation techniques and radio frequency parameters, but is characterized by its capability of both being remotely set up and diagnosed, and by its capability of providing diagnostic information while on line. For the purpose of the following description of these capabilities, it is assumed that a network of at least two wireless modem units in accordance with the invention and within radio range of one another has been set up, and that one of these modems, designated the master, has been selected to source set-up instructions and receive diagnostic data.

Each modem unit is capable of operating in a normal on-line mode in which it encodes and transmits data from the port 2 on air or receives data packets transmitted on air by another modem unit and decodes and passes data addressed to it to the port 2. It is also capable of operating in a conventional command mode in which it receives commands from a computer connected to the port 2 and acknowledges and/or returns data in response to those commands. Typically, the modem unit is placed in command mode by raising the DTR handshaking line, and commands are applied to its port 2 by a computer running radio set-up software (RSS).

The modem of the present invention provides extensions of these modes which enable remote set-up and diagnostic monitoring. Thus a modem unit placed in command mode may be sent a command prefixed by a string which identifies the command as a remote command, i.e., one to be executed by a remote modem, and identifies the remote modem unit by its ID number. On recognizing a remote command, the modem unit incorporates it into a data record or packet identified as a command record and addressed to the destination modem unit, and transmits it on air. A listening modem unit which identifies the record as being addressed to it will recognize the record as a command record, act on the command, and will transmit an acknowledgement or response record to the command, addressed to the sending unit and identified as a response to a command record. A preferred command protocol is set out in more detail below.

The unit receiving commands from the RSS is considered the master unit and a remote unit as a slave unit. The master initiates communication and the slave which is addressed will always respond in some way if it is functional and within range.

For every command issued to the slave, some response is generated and sent to the master and hence to the RSS. If no data is being returned, then a R8 (error report) message is returned with (assuming no actual error) an OK message (0) within it to acknowledge the command. The unit may then transmit a test tone of some sort if that was required by the command.

If data is to be returned to the master, then a sequence of R1 records is generated by the slave, one carrier sequence per response, then an R9 end of data record is sent. An R8 record will be issued as for all responses at the very end of the response. The above R-type (return) records are of the format already standardized by Motorola, as are the S-type (send) records referenced below.

The RSS may see echoes of its own commands being sent to the remote unit and these echoes must be discarded by the RSS. A timeout of about 3 seconds is used by the RSS software in waiting for a response from the remote unit.

The variable length on air record consists of the following elements:

- 72 bits (9 character) packet preamble (DaTaRaDiO in ASCII)
- 16 bits (2 bytes) length of bytes to follow, high byte first
- 32 bits (4 bytes) destination ID, binary data, high byte first
- 32 bits (4 bytes) origin ID, binary data, high byte first
- n bytes ASCII text (setup command (no CR), see below)
- 16 bit CRC for all bytes previous to this word.

The ASCII set-up commands and response set follow below. Those primarily concerned with diagnostics are marked with an asterisk.

A 16 bit CRC (cyclic redundancy check) is calculated in a conventional manner using CRC-CCITT implemented in the firmware of the controller.

| Command Set | |
|---|---|
| COPTEST | Watch dog test |
| RESET! | Forces reset |
| *RSSI | Asks for RSSI level |
| D & DE | Dump whole eeprom |
| DA | Dump whole ram |
| DC | Dump config register |
| DF | Dump factory ID data |
| *TONEXX | Ask for test tone xx hex seconds |
| *BALANCExx | Ask for 15 Hz test modulation for balance, xx secs. |
| *CARRIER | Ask for just a carrier xx hex seconds |
| *PSUDOxx | Ask for xx test data lines in 1 transmission |
| FACTORYDEFAULTS | Restores EEPROM user area only |
| COLDDEFAULTS | Restores COMPLETE EEPROM SPACE |
| ZNWT | Zero number of writes for product |
| *AR | Analog measurement reset |
| *AS | Dump Analog values |
| *AQ | Dump line quality stats |
| *NR | Network online measurements reset |
| *NS | Dump Network online measurement values |
| S0 | Motorola S0 empty data (checks checksum only) |
| S1 | Load EEPROM with data (checks checksum) |
| S8 | Error/pass code |
| S9 | Calculate new EEPROM checksum now |
| R0 | S0 format being returned from the radio (dump) |
| R1 | S1 format being returned from the radio (dump) |
| R8 | Error/pass code and done message from radio |
| R9 | Indicates data transfer complete (after some R1's) |
| T0 | Turn off test mode (temp frequency) |
| T1 | Load synthesizer with test data |
| ? | Dump ID string |
| UNIT | Returns only the Unit ID number |
| WARPEExx | Permanently warp all channels by small amount (optional) |

The ANS string is prefixed automatically by the controller firmware of the remote unit to any response string to be sent to output port of the master unit before the response is transmitted by the remote unit.

The following set-up command prefix is used by the RSS to indicate to the firmware of the master unit that it should pass the command to a remote unit and will be stripped from the command before it is sent to the remote unit.

REM00000000 Prefix any command going to the set-up port with the destination address.

All command strings are generated using only upper case characters.

The data loaded/returned in S1/R1 records is a function of the programming of the units and is interpreted accordingly. Examples are shown below.

EXAMPLE 1

Make the local radio transmit one 'fox' test line.
    Put the radio into set-up mode.
    Send the string "PSUDO01<CR>" to the unit.
    Unit will respond with R80200FD<CR><LF> and then transmit one banner and one fox line.

EXAMPLE 2

To ask remote unit ID 3 from unit ID 1 to dump analog values, the command AS with the REM . . . prefix or REM00000003AS<CR> is presented to the master unit which in turn sends over the air a command packet with a destination address of 3 and a return address of 1, as follows:
    preamble, length, dest.ID, origin ID, command, crc16
        D a T a R a D i O ( 0 × 0 0 0 A ) 0 × 0 0 0 0 0 0 0 3
        (0×00000001) AS (0×D4C1)

As an example, the unit 3 could return a byte (in practice more than 1 byte would probably be returned) and 2 closing packets in Motorola format:

DaTaRaDiO(0x0019)0x00000001) (0x00000003)ANSR1040DF09965<CR><LF> Data would normally consist of many R1 transmissions with incrementing addresses in the R1 record. After all data lines are sent a R9 record is sent to indicate data transmission is complete:

DaTaRaDiO(0x0017)(0x00000001)(0x 00000003)ANSR9030000FC<CR><LF> followed by the R8 (done, ready for more commands) record: DaTaRaDiO(0x0015)(0x00000001)(0x 00000003)ANSR80200FD<CR><LF>

It should be noted that responses have the ANS prefix.

In order to obtain diagnostic data on a continuing basis from remote modem units without the necessity for a unit to be in set-up mode, it is a feature of the invention that the modems provide for each transmit sequence from a modem unit to be preceded by a fixed length header containing diagnostic data. This can be achieved by using the microcontroller to control gates 12 to 22 and the handshaking lines of the port 2. When a data sequence is to be sent through the port 2 to a modem unit for transmission, as indicated by raising of the RTS line, the gate 16 is activated so that the header containing diagnostic data can be output from the microcontroller 10 to the converter 24A before the CTS line is raised and the data to be sent is passed to converter 24A through gate 12. Likewise, when a data sequence is received, the gate 20 is activated for the duration of the header before the DCD line is raised to indicate at the port the reception of data, and the gate 18 is activated. Data recovered from the header by the microcontroller firmware may be transmitted to the port 2 by activating the gate 22. Gate 14 is used in command mode to allow the microcontroller to receive data from the port 2.

A preferred online protocol for the construction of the diagnostic header is described further below.

Online diagnostics provide for the transmission of up to 6 statistical data items to other units while normal user traffic or command packets are being transmitted. This is done by inserting this record just before the user equipment attached to the port 2 of the modem is released to send its data. The 6 items are normally those indicated below but the protocol is expandable to many other items or formats.

The six normal items are selected from the data monitored by the A/D inputs of the microcontroller, or data computed by the microcontroller, and are:

last RSSI reading
last TEMP_M reading
last main B+ reading
last computed quality index for the receiver on the channel
last fwd power (if this signal is available from the transceiver)
last rev power (if this signal is available from the transceiver)

The protocol multiplexes 6 bytes per transmission. Normally only 1 transmission is necessary to send the required data, but extensions to more than 6 items could take more packets. Each receiving unit stores the 6 items while user traffic is being transmitted.

Either all units must send the diagnostic header or none may as there is no way for its presence to be predicted by a receiving unit.

The preferred protocol defines a 72 bit header multiplexing 6 data items as follows:

7 repeater flag (keep/replace this data)
6 bit 9
5 bit 8 of ID address
4 ID address greater than 1023 (truncated) flag
3.2 spare bits which are to be set to zero
1.0 2 bit code indicating what the 6 bytes are carrying:
   00 rssi temp b+ quality, bytes 5, 6 are empty
   01 rssi temp b+ quality, fwd, rev powers
   10 spare, to b determined at a future time
   11 use first data element as an extension code
15 . . 8 low address bits of source ID for this data which follows
23 . . 16 first byte data element or extension codes for bytes 2 . . 5
31 . . 24 second data or first data when extensions are in use
39 . . 32 third"
47 . . 40 fourth"
55 . . 48 fifth"
63 . . 56 sixth"
71 . . 64 checksum value so the sum of all bytes including this one remains at zero mod 256.

When an online data sequence is received, a unit will strip off the 72 bits, process the data if required and present the remaining user data to the user port.

The quality index is computed as the ratio of a count of the number of good records received to the total number of times at least 9 bytes were received with online diagnostic mode enabled. This provides an indication of the link quality and is returned by the firmware.

EXAMPLE 3

Preamble transmitted before user data.

0x01 flag/set indicating power is present
0x01 truncated unit id=1 (id is actually 1 as the truncated bit not set in flags)
0xC3 rssi in raw (hardware) units
0x70 temp in raw units
0x8F b+ voltage in raw units
0xFF quality index (ff indicates no packets received yet)
0x4D forward power in raw units
0x07 reverse power in raw units
0xE9 checksum The arithmetic sum is 0x400, and as the mod 0x100 of 0x400 is zero, this packet is deemed good.

The firmware programmed into the EEPROM memory implements the functions discussed above using conventional techniques used for programming embedded microcontrollers, and need not be described in detail particularly since much of it employs routines similar to those utilized in the control of known modems. Certain routines relevant to the novel aspects of the applicants' modem are however set forth in the following pseudocode.

PSEUDO CODE

The following tasks describe in general terms what are the normal procedure for the transport of command data using a half duplex link. The command packet protocol follows a basic master slave sequence, where one unit initiates a sequence as master unit. Every command issued across the network requires a R8 response record to be returned. 32 bit addresses permit selection of a any unit. If data is being returned in response to a command the R1/R9 data sequence will be followed by the R8 record.

```
main task:
   main init task
   run in parallel
      rx task
      tx task
      setup task (local port)
      fill queue (incoming user data)
      fill queue (incoming secondary command data)
      empty queue (outgoing user data)
      empty queue (outgoing secondary command data)
   forever
main init task:
   setup hardware
   init operating system
      init all variables for other tasks
   done
setup task:
   if (setup_command_found_waiting)
      parse and execute command
   done
tx task:
if (need_to_transmit)
   prepare hardware
      key transmitter
         wait until turn on (t1) time has passed
   if (ONLINE mode)
      build preamble
      send preamble
      wait until all bytes have gone out
      wait until at least one synchronous flag time passed
   repeat
      if (command_to_send_ending)
         build command packet from incoming secondary data
         send command packet
         wait until command packet transmitted
      if (incoming user data)
         send incoming user data
   until not (need_to_transmit)
   wait until turn off (t2) time has passed.
   unkey transmitter
   done
rx task:
if (carrier_found)
   prepare hardware
   wait until clamp time has passed
   if (ONLINE mode)
      receive preamble
      demultiplex preamble
   repeat
      receive user data
      if (user data is command)
         parse and execute command
      else fill queue (outgoing user data)
   until not (carrier_found)
   if (delayed command execution)
      execute delayed command
   done
build preamble:
   Build up a multiplexed data preamble record as follows . . .
            7              repeater flag (keep/replace this record)
            6              bit 9
            5              bit 8 of ID address
            4              ID address greater then 1023 (truncated) flag
            3 . . . 2      spare bits which are to be set to zero
            1 . . . 0      2 bit code indicating what the 6 bytes are carrying . . .
                           00 rssi temp b+ quality, bytes 5, 6 are empty
                           01 rssi temp b+ quality, fwd, rev powers
                           10 spare, to be determined at a future time
                           11 use first data element as an extension code
            15 . . . 8     low address bits of source ID for this data which follows
            23 . . . 16    first byte data element or extension codes for bytes 2 . . . 5
            31 . . . 24    second data or first data when extensions are in use
            39 . . . 32    third data or first data when extensions are in use
            47 . . . 40    fourth data or first data when extensions are in use
            55 . . . 48    fifth data or first data when extensions are in use
            63 . . . 56    sixth data or first data when extensions are in use
            71 . . . 64    checksum value so the sum of all bytes including this one
                           remains at zero mod 256.
   . . . and convert to n bytes.
```

-continued

```
    done
receive preamble:
    accept exactly n bytes required for preamble
    done
demultiplex preamble:
    using multiplex record defined above decode data
    store as part of locally maintained statistic record
    queue to secondary command port if required
    done
encode command packet:
The variable length on air record is defined by the following
elements. Data is converted to async data before actually going
on the air.
    72 bits (9 character) packet preamble (DaTaRaDiO in ASCII)
    16 bits length of bytes to follow, high byte first
    32 bits destination ID, binary data, high byte first
    32 bits origin ID, binary data, high byte first
    n bytes setup class command
    16 bit CRC for all bytes previous to this word.
        (x^16 + x^15 + x^2 + 1)
    done
decode command packet:
    check that data follows the encoding command packet protocol
    if (checks ok)
        execute command
    done
parse and execute command:
    Check which one of the setup commands listed above needs to
be executed.
GRAMMAR for COMMAND and RESPONSE String Assembly:
```

| | |
|---|---|
| online transmission | [preamble] [user data \| command packet] |
| regular transmission | [user data \| command packet] |
| preamble | [<72 bit record defined above>] |
| user data | [<any user data>] |
| command packet | [DaTaRaDiO] |
| | [<16 bit length>] |
| | [<32 bit destination address>] |
| | [<32 bit origin address>] |
| | [answer string " command string] |
| | [<crc(x^16 + x^15 + x^2 + 1)>] |
| answer string | [ANS] [<command string>] |
| commands string | [<setup>\|<load data radio>\|<load data rss>] |
| | [<R8 record>] |
| setup | [<commands from list above>] |
| load data radio | [<load data radio>]\|[S1 record>] [<S9 record>] |
| load data RSS | [<load data RSS>]\|[R1 record>] [<R9 record>] |
| S1 record | Standard Motorola S1 record with checksum. |
| R1 record | Same as S1 but the S is replaced with a R so external software can tell echoed data from outgoing data. |
| R9 record | Same as Motorola S9, end of data mark from radio. |
| R8 record | Same as R1 record but the 8 denotes error codes contained instead of data items. |

S8/R8 records transport one or two byte from the following codes . . .
S8/R8 record Error codes:

| | | |
|---|---|---|
| SE8_NO ERROR | 0 | OK, command received and accepted |
| S8E_BADCOMMAND | 1 | Illegal command for addressed unit |
| S8E_BADDATA | 2 | Non hex char found in S1 strings |
| S8E_BADCKSUM | 3 | S1 string checksum failed check |
| S8E_BADADDRESS | 4 | S1 record address out of range |
| S8E_EMPTY_ERROR_CODE | 99 | Empty record, no code present |
| S8E_RSSI_CODE | 128 | Next byte is rssi (signal strength) value |
| S8/R8 record | [<SIR>] [802] [<error code>] [<checksum>] | |
| R8 RSSI record | [R80380] [<signal strength>] [<checksum>] | |

It will be appreciated that the description provided above is exemplary only of the presently preferred embodiment of the modem, and changes both to the modem hardware, the protocols employed and in the operation of the modem may be made within the scope of the invention, the use of which is not necessarily restricted to wireless modems.

We claim:

1. A modem unit comprising a bidirectional serial digital data port, a transceiver, and a modem receiving digital data for transmission from said port and converting it to analog signals for modulating a transmitter of said transceiver, and receiving and demodulating analog signals from a receiver of said transceiver to received digital data provided to said port, said modem unit further comprising a microcontroller connected to provide to said modem data to be modulated and transmitted and to receive received and demodulated data from said modem, and switches connected between the port, the modem and the microcontroller and controlled by said microcontroller, the switches determining whether said modem receives data to be transmitted from the microcontroller and/or the port and whether the modem passes received data to the microcontroller and/or the port, and whether the microcontroller receives data from the modem and/or the port.

2. A modem unit according to claim 1, further including control and handshaking lines connected between the port and the microcontroller.

3. A modem unit according to claim 1, further including means monitoring operating parameters of the modem unit, and connected to the microcontroller, and control lines for the transceiver connected to the microcontroller.

4. A modem unit according to claim 1, wherein the transceiver is a radio transceiver.

5. A modem unit according to claim 1, wherein the microcontroller is programmed to respond to a signal on a control line from the port to the microcontroller to place the modem in a command mode by operating switches to connect the microcontroller to receive data strings representing commands from the port, and the microcontroller is programmed to recognize a prefix to certain commands identifying them as remote commands, and to respond thereto by operating switches such that the modem receives data to be transmitted from the microcontroller and retransmits such commands to the modem.

6. A modem unit comprising a bidirectional serial digital data part, a transceiver, and a modem receiving digital data for transmission from said port and converting it to analog signals for modulating a transmitter of said transceiver, and receiving and demodulating analog signals from a receiver of said transceiver to received digital data provided to said port, said modem unit further comprising a microcontroller connected to provide to said modem data to be modulated and transmitted and to receive received and demodulated data from said modem, and switches connected between the port, the modem and the microcontroller and controlled by said microcontroller, the switches determining whether said modem receives data to be transmitted from the microcontroller and/or the port and whether the modem passes received data to the microcontroller and/or the port, and whether the microcontroller receives data from the modem and/or the port; the modem unit further including means connected to the microcontroller for monitoring operating parameters of the modem unit, and control lines for the transceiver connected to the microcontroller; and the microcontroller being programmed to optionally prepend a header containing data from said monitoring means to data strings passing through the unit from the port to the modem, and to strip headers containing such data received from another modem from data strings passing through the unit from the modem to the port.

7. A modem unit comprising a serial dataport, a modem, a transceiver, and a microcontroller programmed to control the passage of data sequences to be transmitted from the port through the modem to the transceiver, and received data sequences from the transceiver through the modem to the port, wherein the microcontroller is connected to sense plural operating characteristics of the modem, wherein the microcontroller is programmed to have the capability of being set up to delay a data screen from the external port while it delivers to the modem a diagnostic header containing data as to said operation characteristics, and wherein the microcontroller is programmed if so set up both to delay admission to the port of a data sequence received from said transceiver and modem and diverts to itself a diagnostic header prepended to said received data sequence.

8. A modem unit according to claim 7 wherein the transceiver is a radio transceiver.

9. A modem unit comprising a serial data port, a modem, a transceiver, and a microcontroller having a control program programmed to provide an on-line mode controlling the passage of data sequences to be transmitted from the port through the modem to the transceiver, and received data sequences from the transceiver through the modem to the port, the microcontroller also being programmed to provide a command mode in which the program interprets data sequences received through the port and executes commands comprised by those sequences, the improvement wherein the microprocessor is programmed in command mode to recognize data sequences from the data port having a predetermined first prefix as a command to construct a data sequence incorporating a further command and the address of a remote modem unit comprised by the original data sequence, said further command itself having a further prefix identifying it as containing a command, and to send the constructed sequence through the modem to the transceiver, and wherein the microcontroller is programmed to recognize data sequences received from the transceiver and the modem and having such a further prefix as containing either a further command or a response to a command.

10. A modem unit according to claim 9, wherein the transceiver is a radio transceiver.

11. A modem unit according to claim 9, wherein the microcontroller is connected and programmed to sense plural operating characteristics of the modem, wherein the microcontroller is programmed to have the capability of being set up to delay a data strong from the external port while it delivers to the modem a diagnostic header containing data as to said operating characteristics, and wherein the microcontroller is also programmed if so set up to delay admissions to the port of a data sequence received from said transceiver and modem while it diverts to itself a diagnostic header prepended to said received data sequence.

12. A modem unit according to claim 11, further including switches connected between the port, the modem and the mcirocontroller, and controlled by said microcontroller, the switches determining whether said modem receives data to be transmitted from the microcontroller and/or the port and whether the modem passes received data to the microcontroller and/or the port, and whether the microcontroller receives data from the modem and/or the port.

* * * * *